United States Patent [19]

Henri et al.

[11] Patent Number: 5,454,691

[45] Date of Patent: Oct. 3, 1995

[54] FLOW-STRAIGHTENER VANE FOR COUNTER-TORQUE DEVICE WITH DUCTED ROTOR AND DUCTED FLOW-STRAIGHTENING STATOR, FOR HELICOPTER

[75] Inventors: Fernand B. Henri, Chateauneuf-les-Martigues; Elian A. Rémy, Vitrolles, both of France

[73] Assignee: Eurocopter France, Marignane Cedex, France

[21] Appl. No.: 298,310

[22] Filed: Sep. 1, 1994

[30] Foreign Application Priority Data

May 4, 1994 [FR] France ............................ 94 05480

[51] Int. Cl.⁶ .......................... B64C 27/20; F01D 9/00; F04D 29/54
[52] U.S. Cl. ......................... 415/209.3; 415/211.2; 415/215.1; 244/17.19
[58] Field of Search ........................ 415/209.2, 209.3, 415/210.1, 211.2, 215.1; 244/17.19

[56] References Cited

U.S. PATENT DOCUMENTS

| | | | |
|---|---|---|---|
| 3,594,097 | 7/1971 | Mouille et al. | 416/104 |
| 4,585,391 | 4/1986 | Vuillet et al. | 415/210.1 |
| 4,594,761 | 6/1986 | Murphy . | |
| 4,626,173 | 12/1986 | Mouille et al. | 416/134 A |
| 5,131,604 | 7/1992 | Yoerkie, Jr. et al. | 244/17.19 |
| 5,251,847 | 10/1993 | Guimbal | 244/17.19 |
| 5,272,869 | 12/1993 | Dawson . | |

FOREIGN PATENT DOCUMENTS

| | | | |
|---|---|---|---|
| 1531536 | 5/1968 | France | 244/17.19 |
| 2534222 | 10/1982 | France | 415/210.1 |
| 2145774 | 8/1983 | United Kingdom . | |

OTHER PUBLICATIONS

Proceedings of the nineteenth european rotorcraft forum, 14 Sep. 1993, "A new generation of fenestron fan-in-fin tail rotor on EC 135" by Vialle and Arnaud.

*Primary Examiner*—Edward K. Look
*Assistant Examiner*—Michael S. Lee
*Attorney, Agent, or Firm*—Larson & Taylor

[57] ABSTRACT

The vane (9) comprises a hollow metal central part forming its main vane section (24) and the vane (9) root (17) and vane (9) tip (18) are each arranged as an end fitting (25, 28) equipped with at least one transverse tab (26, 29) for fastening the vane (9). The method of manufacture consists in extruding a hollow metal section of cross-section corresponding to the aerodynamic profile of the vane, in cutting off a section portion of length not substantially less than the span of the vane, and in arranging each end of the section portion as an end fitting with at least one fastening tab, either by machining and deformation of the ends of the section portion, or by fitting end fittings attached to its ends.

14 Claims, 5 Drawing Sheets

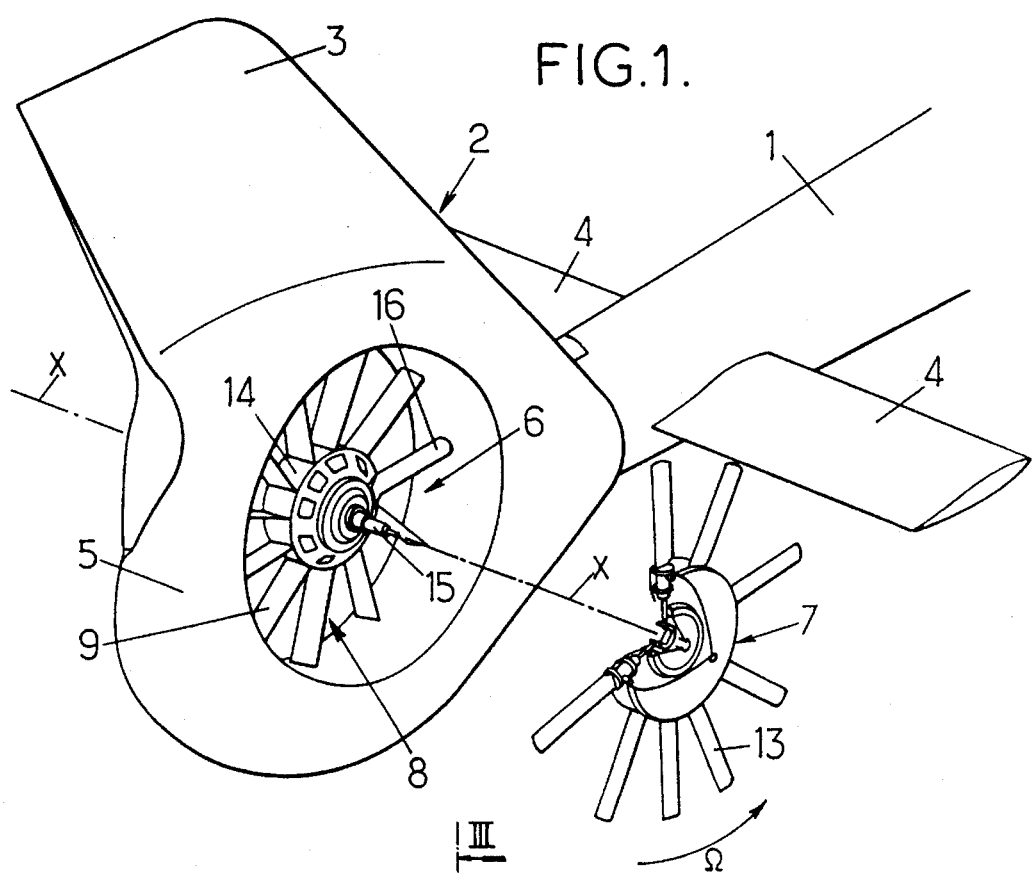
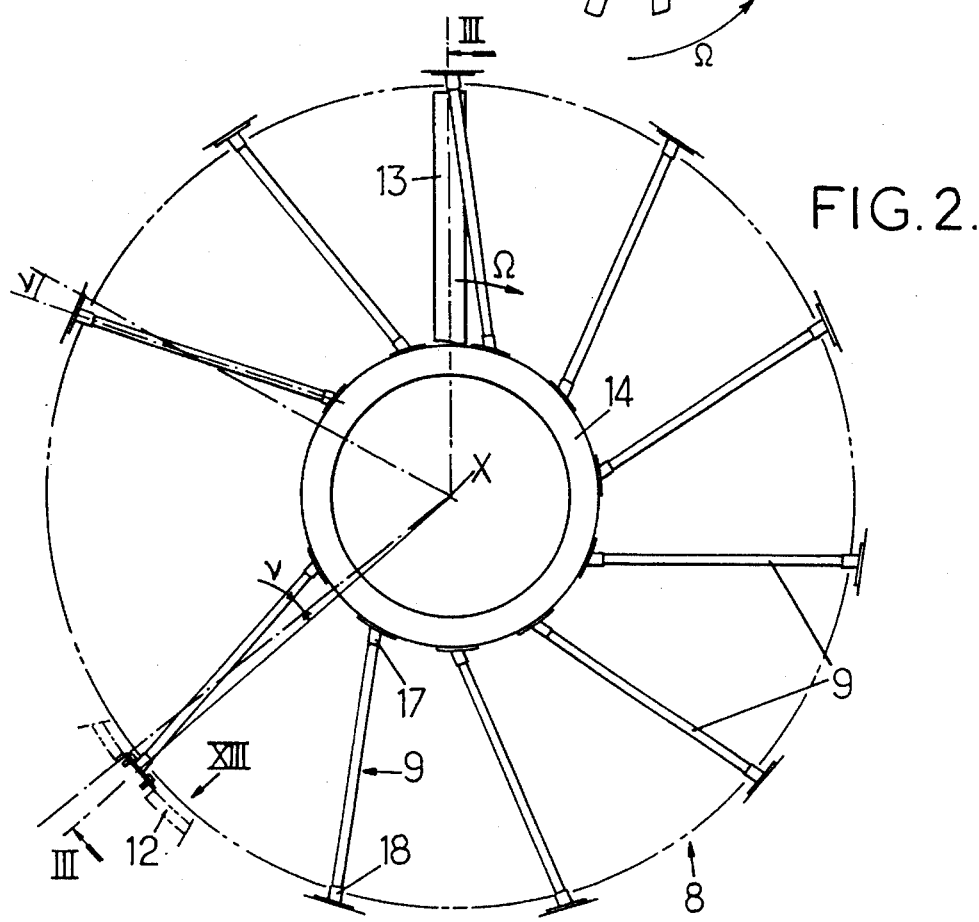

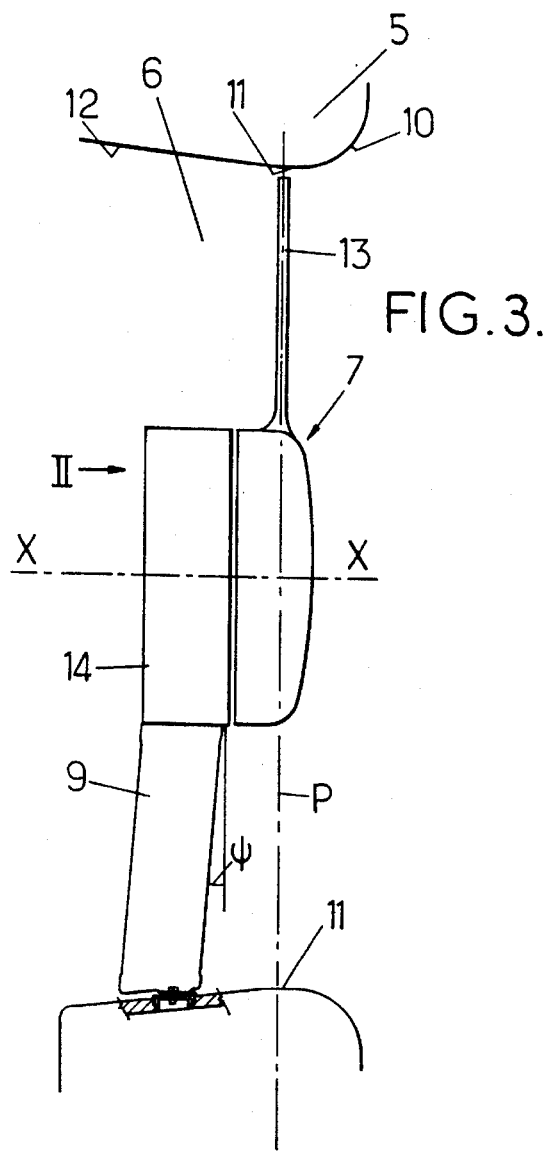
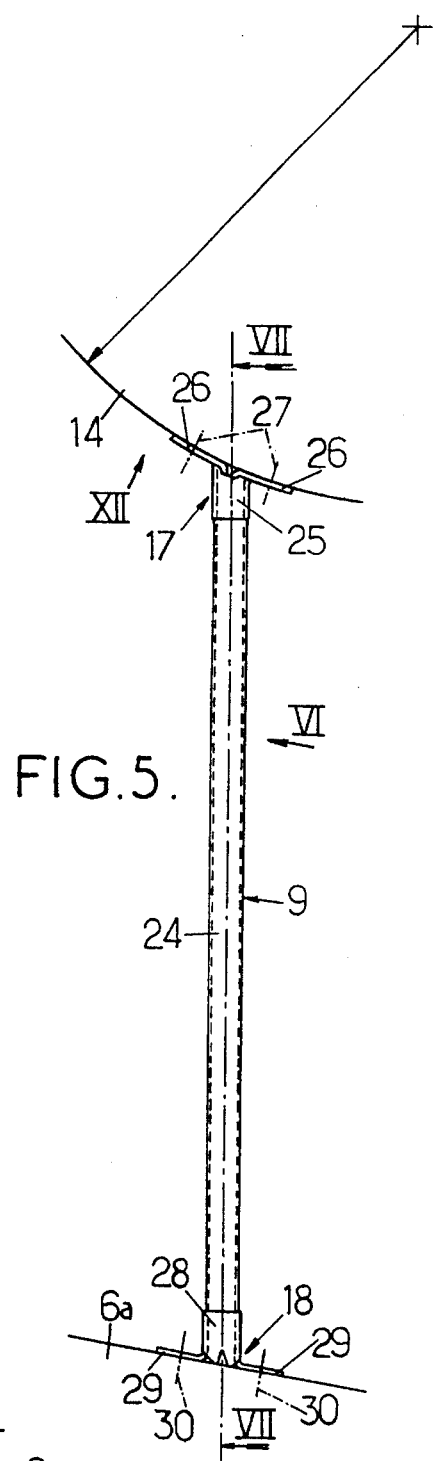
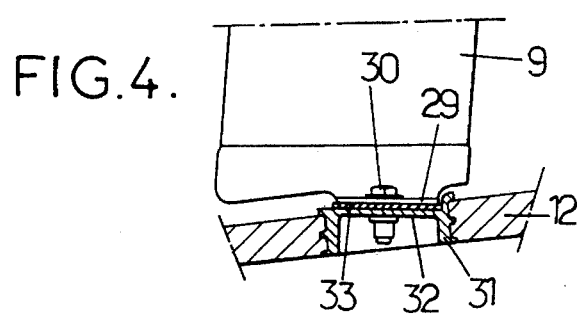

FLOW-STRAIGHTENER VANE FOR COUNTER-TORQUE DEVICE WITH DUCTED ROTOR AND DUCTED FLOW-STRAIGHTENING STATOR, FOR HELICOPTER

FIELD OF THE INVENTION

The invention relates to the counter-torque devices of the type comprising a variable-pitch multi-blade rotor as well as a flow-straightening stator with profiled vanes fastened downstream of the rotor, and which are ducted in the rear parts of helicopters with a single main or lift rotor, as described in French Patent FR 2 534 222, and the invention relates more precisely to a flow-straightener vane and to a method for manufacturing such a vane.

BACKGROUND OF THE INVENTION

FR 2 534 222 makes known a counter-torque device with ducted tail rotor and ducted flow-straightening stator for a helicopter, including a duct, of axis substantially transverse to the helicopter, and in which are located, on the one hand, the rotor, substantially coaxial with said duct and generating a transverse flow of air, and, on the other hand, the flow-straightening stator, including a plurality of profiled vanes fastened inside said duct downstream of the rotor with respect to the flow of air, and arranged in a substantially radial fashion with respect to said duct so as to be able to recover rotational energy from the flow of air at the exit from the rotor in the form of a counter-torque axial thrust adding to that produced by the rotation of the rotor within the duct, without increasing the power transmitted to the rotor for this purpose.

French Patent FR 2 534 222 also proposes for the vanes of the flow-straightener to extend between a stationary central body substantially coaxial in the duct and the annular wall of the fairing duct, and for them to provide alone the mechanical link between this stationary body and said wall, and therefore fastening of the stationary body and of the rotor, mounted so that it can rotate on this body, within the duct, as replacement for support arms, often numbering three, generally used to provide this mechanical link between the stationary body and the wall of the duct.

It is further proposed in the abovementioned patent for the duct to exhibit, from the upstream end to the downstream end, a convergent inlet with rounded edge, a cylindrical part, in which the blades of the rotor rotate and a divergent nozzle ending in a divergent outlet, the flow-straightener being located within the divergent nozzle, and it being possible for the vanes which constitute it to be independent of one another and to have a constant aerodynamic profile and zero twist, for example a profile of the NACA 65A10 type. Such a flow-straightener with profiled stationary vanes simultaneously fulfills several functions and gives significant advantages:

from the aerodynamic and acoustic standpoints, the vanes straighten out the airflow leaving the rotor and thus enable some of the rotational energy of the airflow to be converted into additional counter-torque thrust, and the replacement of the known support arms [most often cylindrical and of relatively sizeable diameters, bathed in the flow from the rotor and constituting one of the significant sources of noise of the device by means of the noise of interaction between the rotor and the support arms] with profiled vanes decreases the drag while reducing the acoustic emission of the ducted device;

from the standpoints of the transmission of loading and rigidity, the flow-straightener connecting the structure of the helicopter to the mechanical assembly mounted in the duct makes it possible to transmit all the loadings from the hub of the rotor, from the rear transmission box (for the rotational drive of the rotor) and from the collective pitch control of the blades of the rotor to the wall of the duct, these loadings being better distributed by the vanes in the fairing, so that the use of ribs for taking up loading in the latter proves pointless, the flow-straightener increasing the rigidity of the assembly owing to the fact that its vanes provide more numerous points for taking up loads on the wall of the duct than a conventional tripod of support arms.

SUMMARY OF THE INVENTION

The problem at the root of the invention is to propose vanes of which the structure is Simple and economical and designed for easy and independent fastening of each vane, in a way which allows it advantageously to fulfill the abovementioned simultaneous functions.

Another object of the invention is to propose a method for economical production of such flow-straightener vanes.

To this end, the object of the invention is a flow-straightener vane, for a helicopter counter-torque device of the type known from FR 2 534 222 and comprising:

a duct of axis substantially transverse to the helicopter and passing through a fairing in the rear part of the helicopter, a rotor substantially coaxial with the duct and mounted so that it can rotate in the duct on a central body, also substantially coaxial to the duct, so that its rotation generates a flow of air in the duct, and a flow-straightening stator, fixed into the duct downstream of the rotor with respect to the direction of flow of the air, and including vanes each exhibiting a main vane section with aerodynamic profile straightening out the airflow downstream of the rotor toward the axis of the duct as well as a vane root and a vane tip at the respective ends of the main vane section, and via which the vane is linked respectively to the central body and to the annular wall of the duct, so as to support the body in the latter, and the vane is one wherein it comprises a hollow metal central part forming at least its main vane section, and wherein at least one of its vane root and tip is set out as an end fitting equipped with at least one transverse tab for fastening to the central body or to the wall of the duct.

According to an advantageously economical embodiment, the hollow central part is a hollow profiled portion of cross-section, preferably constant, corresponding to the aerodynamic profile, preferably without twist, extending from the vane root to the vane tip.

In this case, and according to a first simple embodiment, at least one vane root or vane tip end fitting comprises a member tightly fitted into a corresponding end part of the section portion and carrying the corresponding fastening tab or tabs, which extend transversely to the span of the vane outside said section portion.

However, it is equally possible that, according to a second simple embodiment, at least one vane root or vane tip end fitting is set out as a cuff in which an end part of the section portion is engaged, the cuff carrying the corresponding fastening tab or tabs.

However, according to the embodiment which is the most advantageous, because it is the most lightweight, at least one vane root or vane tip end fitting is of a single piece with the section portion and each of its fastening tabs is cambered with respect to the suction face and/or the pressure face of the vane which it extends.

In these three embodiments, the vane provides a good mechanical link if, advantageously, each fastening tab of a vane root or vane tip end fitting extends above the suction face part and/or below the pressure face part of the vane and is preferably curved with a curvature substantially corresponding to that of the surface of the central body or of the wall of the duct to which it is intended to be fastened.

In order to lighten the weight of the flow-straightener, each vane is advantageously such that its thickness, in the central portion of its hollow part, is less than its thickness in the end portions of said hollow part.

The rigidity of the vanes and of their link to the central body and to the duct is improved if, in addition, each vane is such that it comprises a spar connecting the suction face part to the pressure face part of the vane, and perpendicular to which there extends at least one tab for fastening at least one of the vane root and vane tip end fittings.

Furthermore, in order to facilitate the linking of the vanes, in particular in the divergent nozzle of the duct, and in order to enable the position of the flow-straightener and therefore of the central body and of the rotor to be adjusted in the duct, it is advantageous for the fastening tab or tabs to be fastened by riveting to the outside of the central body at the vane root, and by screwing and on to at least one insert mounted in the wall of the duct at the vane tip with, as need be, interposition of a removable shim under the vane tip fastening tabs in order to center the flow-straightener in the duct.

Furthermore, in order to decrease the noise created by the of interaction between the blades and the vanes and to take up the torque of reaction to the rotation of the rotor in compression in the vanes, which are not being bent, so as to decrease their deformation and further increase the rigidity of the assembly, it is advantageous for the tabs for fastening the vane root and/or vane tip to be inclined and/or curved with respect to the longitudinal plane extending along the span and passing through the chord of the vane so that the vane, fixed between the central body and the wall of the duct, is inclined to the radial direction with respect to the axis of the duct, preferably by an angle $v$ lying between approximately 0° and approximately 25°.

In addition, in order to further decrease the noise of interaction between the blades of the rotor and the vanes of the flow-straightener, which noise has already been reduced by inclining the vanes to the radial direction, it is advantageous for the tabs for fastening the vane root and/or the vane tip to be inclined and/or curved with respect to said longitudinal plane passing through the chord of the vane so that the vane, fastened to the central body and to the duct wall is inclined at a slant from its root to its tip and from upstream to downstream within the duct, preferably by an angle $\Psi$ lying between approximately 0° and approximately 6°.

Another subject of the invention is a method for manufacturing a flow-straightening vane with an aerodynamic profile in order, on the one hand, to support a central body substantially coaxially within a duct passing through a helicopter rear part and having an axis substantially transversal to the helicopter, and downstream of a substantially coaxial rotor mounted so that it rotates on the body and rotating within the duct and, on the other hand, to straighten out, downstream of the rotor, the airflow generated by the rotation of the rotor within the duct, as known from FR 2 534 222, and the method according to the invention is one wherein it comprises the steps consisting in:

extruding a hollow metal section of cross-section corresponding to the aerodynamic profile of the vane, cutting a section portion of length at least equal to the span of the profiled part of the vane, and arranging at least one end of the section portion as an end fitting equipped with at least one fastening tab for fastening the end fitting respectively to the body or to the wall of the duct.

In the preferred embodiment, it additionally comprises the steps consisting in trimming off at least one end part of the section portion at the leading edge and the trailing edge of the vane, so as to form at least one extension of the suction face and at least one extension of the pressure face, then in cambering said extensions transversely to the vane so as to form said fastening tabs.

Also advantageously, it comprises the step consisting in chemically machining at least the outside of the central part of the hollow section portion in order to reduce the thickness thereof, and therefore the weight and, in addition, it may consist in curving and/or inclining at least one fastening tab of a vane end fitting in a way so as to allow the tab to be shaped to the shape of the body or of the duct wall and/or the inclination of the vane at a slant from the body toward the duct wall and from upstream to downstream of the duct and/or with respect to the radial direction within the duct.

BRIEF DESCRIPTION OF THE DRAWINGS

Other advantages and characteristics of the invention will emerge from the description given hereinbelow, with no limitation being implied, of embodiment examples described with reference to the appended drawings in which:

FIG. 1 is a ¾ perspective rear view of a ducted countertorque device with rotor and flow-straightening stator both arranged in a duct passing through the rear part of a helicopter, the rotor being represented out of the duct with partial cutaway, for greater clarity, FIG. 2 is a partial diagrammatic view, in side elevation, from the exit of the duct, of the flow-straightener of FIG. 1, FIG. 3 is a section on III—III of FIG. 2, and with an axial section of the link of a vane tip to the wall of the duct, FIG. 4 represents, on a larger scale, the detailed axial section of the link of the vane tip to the duct, FIG. 5 is a view on a larger scale and from the rear of a vane of the flow-straightener of FIG. 2.

DETAILED DESCRIPTION OF THE PREFERRED EMBODIMENTS

Figure 6:
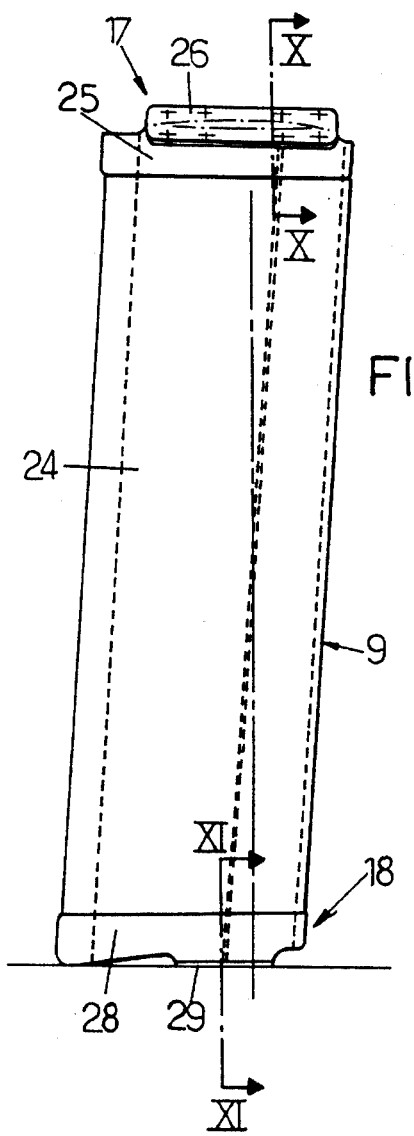
FIG. 6 is a view in side elevation in the direction of the arrow VI of the vane of FIG. 5.

In FIG. 1, the tail boom 1 of a helicopter, of which the fuselage and the single main rotor have not been represented, supports, at its rear end, an empennage 2, the upper part of which is arranged as a vertical stabilizer 3, and a horizontal stabilizer with two control surfaces 4 extending on either side of the boom 1.

The base of the empennage 2 is arranged as a fairing 5 through which there transversely passes a duct 6 for the flow of air for a ducted counter-torque device also comprising a variable-pitch multi-blade rotor 7 mounted so that it can rotate and substantially coaxial in the duct 6, as well as a flow-straightening stator 8, fastened in the duct 6 downstream of the rotor 7 with respect to the direction of flow of the airflow passing through this duct, and including stationary vanes 9.

The duct 6 exhibits, about its axis X—X substantially transverse to the longitudinal axis of the helicopter, a substantially axisymmetric shape described with reference to FIG. 3, and comprising a convergent inlet 10, with a rounded edge, extended toward the outlet of the duct 6, by a cylindrical part 11, itself extended up to the outlet by a divergent nozzle 12. The rotor 7 is mounted in the duct 6 on its inlet side and so that its blades 13 rotate in the cylindrical part 11 of the duct 6, the pitch change axes for the blades 13 defining a plane P of rotation of the rotor, in which they move and which is substantially perpendicular to the axis X—X of the shrouded duct 6. The rotor 7 is mounted and rotationally driven on a central body 14, of cylindro-conical external shape and substantially coaxial with the duct 6, this body 14 being secured to the structure of the epennage 2 by means of the vanes 9 of the flow-straightener 8, which hold the body 14 at the center of the duct 6 and on its outlet side with respect to the rotor 7.

The body 14 is produced by machining a block of aluminum alloy from a blank, possibly a forged blank. In a known fashion, the body 14 encases a mechanism for rotational drive of the rotor 7 by a drive shaft 15, itself driven from a transmission shaft passing through an arm 16 and connected to an auxiliary output from the main transmission box of the helicopter. A part of the arm 16 is located substantially radially in the duct 6, substantially in the place of one of the vanes 9 of the flow-straightener 8, in the space delimited between the two vanes 9 which are separated the most from each other in FIG. 2. In a way which is also known, in order to vary the amplitude of the transverse counter-torque thrust generated by the rotation of the rotor 7 in the duct 6 creating a guided flow of air through the latter, the body 14 and the rotor 7 comprise a device for collective control of the pitch of the blades 13, actuated by a control rod which is not represented, because the arm 16 of FIG. 1 acts as a fairing for the transmission shaft and for this rod.

As regards the structure, the configuration and operation of the rotational-drive mechanism, termed rear transmission box, and of the device for collective pitch control of the blades 13 which are housed in the body 14, as well as of the rotor 7, reference will advantageously be made to the French Patent FR 1 531 536 and to the U.S. Pat. Nos. 3,594,097, and U.S. Pat. No. 4,626,173, which are incorporated into the present descriptive text by way of reference, because these members do not form the subject of the invention.

The vanes 9, fastened into the duct 6 downstream of the blades 13 of the rotor 7, without however leaving the divergent nozzle 12 of the duct 6, recover the rotational energy of the flow of air downstream of the blades 13, by straightening out this flow toward the axis X—X of the duct 6, and procuring an additional counter-torque thrust, as explained in French Patent FR 2 534222, the description of which is incorporated into the present descriptive text by way of reference, in particular as regards the description of FIGS. 4 and 5 of this patent.

The straightening of the airflow by the vanes 9 is provided particularly by the suitable choice of the asymmetric aerodynamic profile of the vanes 9, and in particular of its camber and angular setting with respect to the axis X—X of the duct 6.

In the example of FIGS. 1 to 3, the flow-straightener 8 in a duct 6 1 m in diameter at its cylindrical part 11, comprises ten vanes 9 with aerodynamic profile and the transmission arm 16, which are evenly distributed in a circumferential direction about the axis X—X. However, the arm 16 is substantially radial and of circular cross-section whereas each vane 9 exhibits an aerodynamic profile of NACA 65 type with, for example, a relative thickness of 10%, a constant camber, chosen between approximately 21° and approximately 27°, for example 23°, and a fixed angle of attack chosen between approximately 2° and approximately 3°, for example 2.5°, and orientated so that it is negative. Furthermore, each vane 9 is not radial, but inclined to the radial direction by an angle v lying between approximately 0° and approximately 25°, measured on the span of the vane 9 at 0.8 R where R is the radius of the duct 6 as represented in FIG. 2, this inclination being given from the root 17 of each vane 9, via which it is fastened to the body 14, toward the tip 18 of the vane 9, via which it is fastened to the lateral and annular wall 6a of the fairing duct 6, in the opposite direction to the direction of rotation of the blades 13 of the rotor 7 indicated by the arrow Ω. This angular setting of the vanes 9 with respect to the radial, causes the torque of reaction to the rotation of the rotor 7 which stresses the body 14 to be transmitted in compression in the vanes 9, which are not being bent, which increases the rigidity of the support of the body 14, of the members which it encases and of the rotor 7 in the duct 6.

This inclination v, for example of 10°, also decreases the noise of rotation of the rotor 7, because it prevents the interference between the wake of a blade 13 and a vane 9 from arising simultaneously over the entire span common to the blade and the vane, since the blades 13 are substantially radial with respect to the axis X—X of the duct 6.

The root 17 and the tip 18 of each vane 9, which attach individually to the cylindrical part of the body 14 and to the frustaconical surface of the divergent nozzle 12, are also arranged so that each vane 9 is additionally inclined at a slant from its root 17 toward its tip 18 and from upstream to downstream in the duct 6, by an angle Ψ as shown in FIG. 3, chosen between approximately 0° and approximately 6°, for example 4°. This inclination Ψ enables the leading edge of the vanes 9 to be separated from the plane of rotation P of the blades 13, and therefore from the trailing edge of the latter, particularly in the peripheral part of the duct 6, which is favorable to a decrease in the noise of interference between the blades 13 and the vanes 9. Simultaneously, in the central part of the duct 6, the vanes 9 can keep the body 14 close to the plane P of rotation of the rotor 7, which promotes good centering of the latter in the duct 6.

Figure 7:
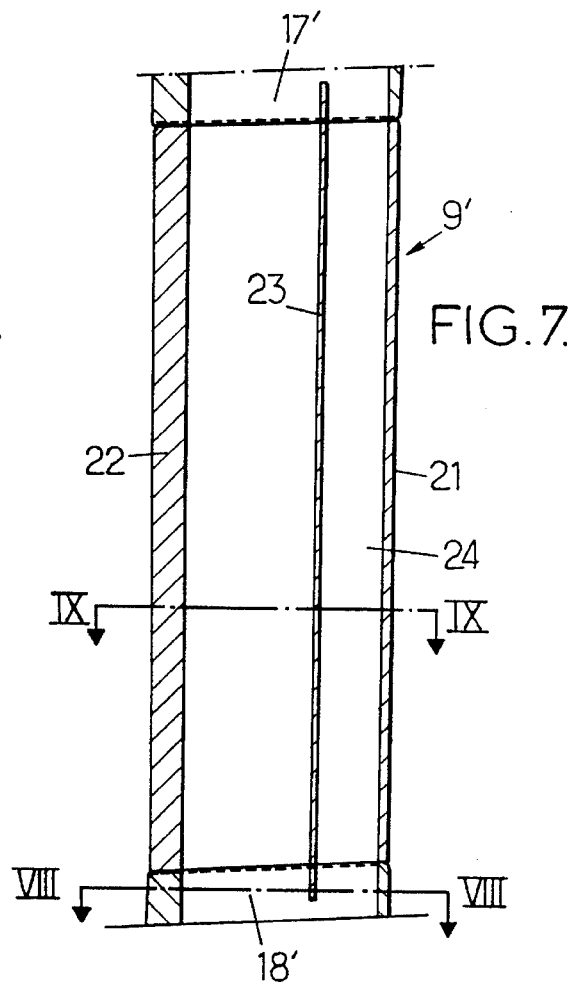
FIG. 7 is a sectional view on VII—VII of the vane of FIG. 5, FIGS. 8 and 9 are transverse sections of the vane on VIII—VIII and IX—IX of FIG. 7, FIGS. 10 and 11 are partial sections on X—X and XI—XI of FIG. 6, respectively at the root and tip of the vane.
Figure 8:
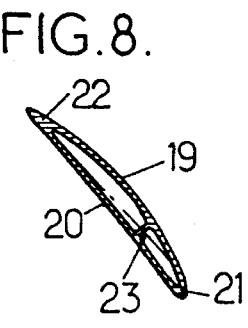

In order to manufacture the blades 9, one starts by producing, by extrusion, a hollow metal section, for example made of aluminum alloy, and the constant cross-section of which corresponds to the aerodynamic profile which has been chosen for the vane 9. Next a section portion 9' is cut off, the length of which is not substantially less than the span of the vane 9, as represented in FIG. 7, and is even greater than the span, in a first example, in order to form fastening tabs of a single piece with the vane 9, as described hereinbelow. The constant cross-section of this section portion 9' is represented in FIG. 8: the convex suction face 19 of this section is connected to the slightly concave pressure face 20, not only at its leading edge 21 and at its trailing edge 22, but also by means of a spar 23. The end parts 17' and 18' of the section portion 9' are then machined, for example skimmed off, by removing material at each end 17' and 18' in the zone of the leading edge 21 and of the trailing edge 22 (and more significantly from the trailing edge 22 toward the spar 23 at the end 18' of the side intended to form the vane tip 18), then by removing material in the ends of the spar 23 (see FIG. 7) so as to form extensions of the suction face 19 and of the pressure face 20, at each end 17' or 18'. Next, these extensions are cambered transversely to the vane 9, so that at each end 17' and 18', the extension of the suction face 19 forms a transverse tab 26 or 29 extending on the suction face side 19 and the extension of the pressure face 20 forms another transverse tab 26 or 29 extending on the pressure face side 20. The central part between the end parts 17' and 18', intended to constitute the main vane section with aerodynamic profile 24 of the vane 9, is next chemically machined, from the outside, in order to reduce the thickness of this main vane section 24 while leaving sufficient material in the end zones which are mechanically the heaviest loaded, by means of their link with the body 14 and the wall of the duct 6.

Figure 9:
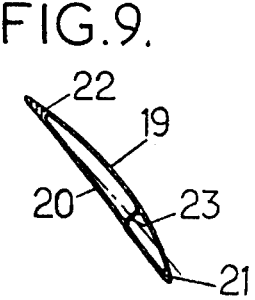
Figure 10:
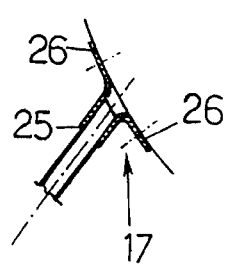
Figure 11:
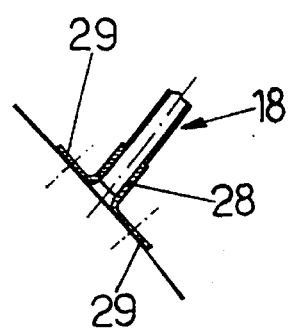

FIG. 9 represents the aerodynamic profile of the main vane section 24 of the vane 9, thinned with respect to the profile of FIG. 8, of the extruded hollow section portion 9'.

The vane root 17 is thus arranged as a root end fitting 25 equipped with two fastening tabs 26 of a single piece with the main vane section 24.

In similar manner, the vane tip 18 is arranged as an end fitting 26 which also comprises two fastening tabs 29 outside the section but of a single piece with the latter and generally transverse to the longitudinal plane passing through the chord of the vane 9, as are also the fastening tabs 26 of the end fitting 25.

Figure 12:
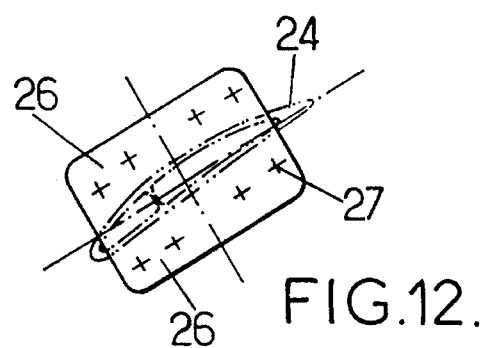
FIGS. 12 and 13 are views in the directions of the arrows XII and XIII respectively in FIG. 5 and in FIG. 2 and show the tabs for fastening the vane root and vane tip.
Figure 13:
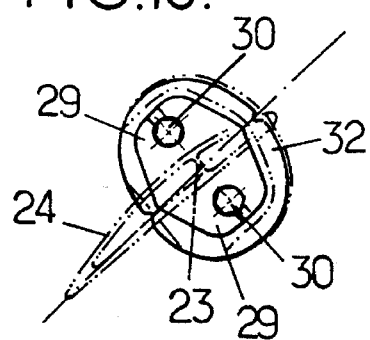

One of the tabs 26 and one of the tabs 29 extends above the suction face part 19 and the other below the pressure face part 20 of the vane 9, each tab 26 has substantially a rectangular shape with rounded vertices (as shown in FIG. 12), which extends over the most part of the chord of the blade 9, whereas each tab 29 rather has substantially the shape of a trapezium with rounded vertices, extending perpendicularly to the spar 23, and over a smaller portion of the chord, as shown by FIG. 13. FIGS. 5, 6, 10 and 11 also show that the transverse tabs 26 and 29 are curved and inclined so as to exhibit a curvature substantially and respectively corresponding to that of the external surface of the body 14 and of the internal surface of the wall of the duct 6a, to which they are applied in order to be fastened thereto, by four rivets 27 for each tab 26 on the body 14, as shown by FIG. 12, and by one screw 30 to hold each tab 29 on the wall of the duct 6a, as shown by FIG. 13. In this way, the curvature of the tabs 26 is much more marked than that of the tabs 29, which may in fact be substantially flat, given their small dimensions with respect to the radius of the duct 6. The inclinations of the tabs 26 and 29 with respect to the main vane section 24 are such that they give the vane 9 the angles of inclination v to the radial direction and Ψ at a slant (see FIGS. 2 and 3) when the root 17 and the tip 18 of the vane 9 are fastened respectively to the body 14 and to the wall 6a of the duct 6 by the transverse tabs 26 and 29.

For fastening the vane tip 18 to the duct wall 6a, an insert 31 presenting a bearing surface 32 may be sealed into the wall of the divergent nozzle 12 as represented diagrammatically in FIGS. 3 and 4, so that the surface 32 is visible on the internal face of the divergent nozzle 12, as being substantially flush with this face. Each fastening tab 29 is then fastened by means of a screw 30 to the surface 32 with interposition between them of a peelable shim 33 which can be kept or removed, as need be, in order to center the flow-straightener 8 in the duct 6 and control the clearance under each vane 9 root 17, in order thus to limit the assembly stresses on the body 14.

The vanes 9, and therefore also the flow-straightening assemblies 8, are interchangeable.

Figure 14:
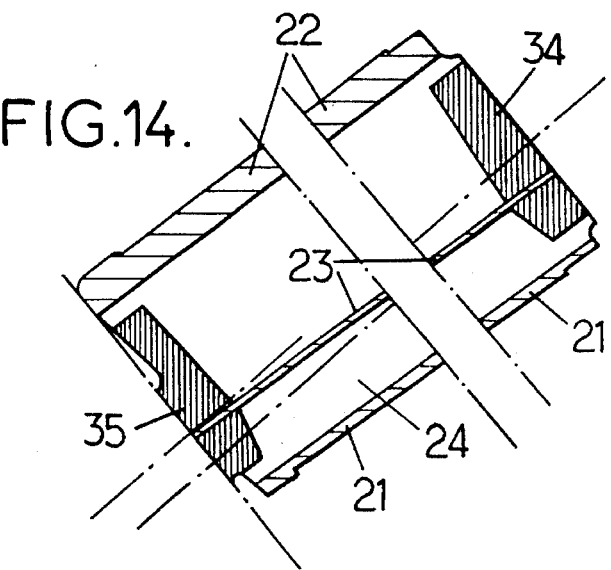
FIG. 14 is a partial longitudinal section of an alternative of the vane of the preceding figures, the section being limited to the parts of the root and of the tip of the vane.

FIG. 14 represents partially in section a vane, as described hereinabove, and additionally including two foam stoppers 34 and 35 inserted into the hollow ends of the main vane section 24, respectively on the vane root and vane tip side, in order to prevent any whistling noise which may be generated by flows of air through the vane 9.

Figure 15:
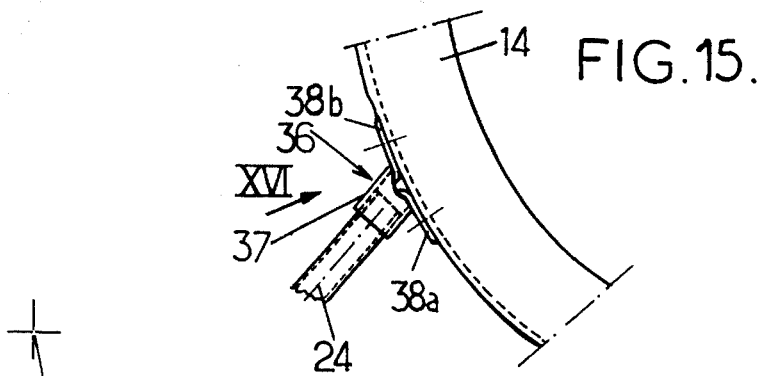
FIG. 15 is a diagrammatic and partial view representing from the rear the link of the root of a second vane example to the body.

FIG. 15 represents a second vane example, limited to its root fastened to the body 14. The main vane section 24 of the vane is formed of a section portion 9' cut substantially to the length of the span of the vane, and the end parts 17' and 18' of which are neither skimmed or cambered. However, the central part between them is chemically machined to decrease its thickness. Then the vane root is produced by tightly fitting and securing the end part 17' into the cuff 37 of a root end fitting 36, for example made of sheet metal, and equipped with two fastening tabs 38a and 38b secured to the narrow and substantially closed bottom of the cuff 37. The tabs 38a and 38b may be of a single piece with the cuff 37 and extend it transversely to the main vane section 24 and/or constitute Just one fastening tab, possibly extending on Just one side of the vane.

Similarly, although not represented, the end 18' of the section portion is tightly fitted and secured into the inside of a cuff of a vane tip end fitting also comprising one or two fastening tabs on the outside of the cuff and generally transverse to the longitudinal plane passing through the chord of the vane, in order to lie a way which is favorable for fastening against the wall of the duct 6a.

The third vane example of FIGS. 16 and 17 can be distinguished from that described hereinabove with reference to FIG. 15 only in the production of the end fittings attached to the root and to the tip of the vane, and mounted on the ends of the hollow metal section portion.

Figure 16:
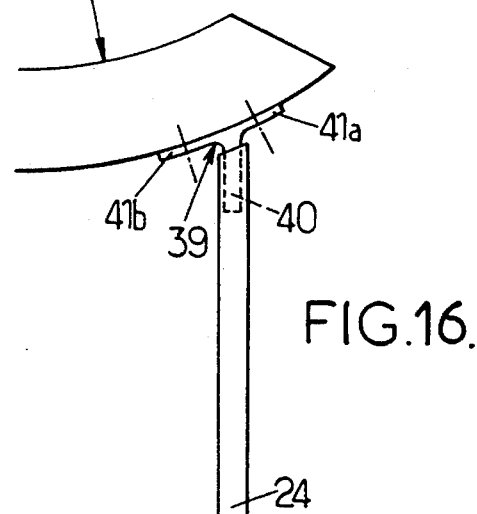
FIGS. 16 and 17 are views corresponding substantially and respectively to FIGS. 5 and 6 for a third vane example.
Figure 17:
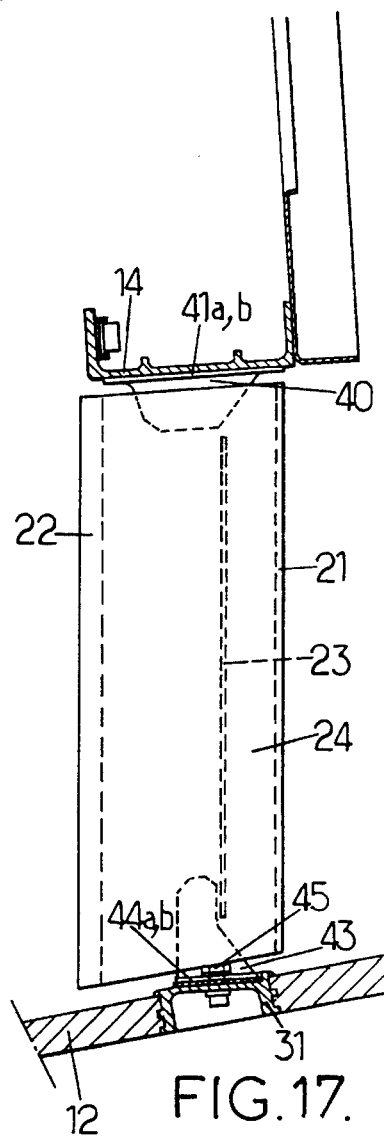

In FIGS. 16 and 17, the end fitting 39 of the vane root 17 comprises a relatively solid metal member 40 which is tightly fitted and held in the corresponding end of the hollow metal section portion constituting the main vane section 24 of the vane. This element 40 or core is secured, by its base, to fastening tabs 41a and 41b which are folded back, in the case of one of them above the suction face part 19 and, in the case of the other, below the pressure face part 20 of the profiled main vane section 24 and which are curved and inclined in the same way as the tabs 26, 38a, 38b of the preceding examples. The tabs 41a and 41b may be of a single piece of sheet metal with the core 40, for example folded into a U in that part of it which is inserted into the profiled portion of the vane, and are each fastened by four rivets to the external surface of the body 14, as in the example of FIGS. 5 to 13.

Likewise, the end fitting 42 of the vane tip comprises a member or core 43, which is relatively solid and made of metal, fitted tightly and held in the corresponding end of the hollow metal section portion forming the main vane section 24 of the vane, this core 43 also carrying, via its base, two fastening tabs 44a and 44b which are inclined transversely, with respect to the span of the vane, and possibly curved, in the same way as the fastening tabs in the preceding examples, so as to be fastened, for example by two screws 45, against the internal face of the divergent nozzle 12 of the duct 6, by means of a monolithic insert such as 31 in FIG. 4. As for the end fitting 39 of the vane root, the tabs 44a and 44b for fastening the end fitting 42 of the vane tip may be of a single piece with the core 43, made of sheet metal folded over into a U in the section portion.

The holding of the cores 40 and 43 of the end fittings 39 and 42 in the corresponding ends of the hollow section portion, as, moreover, the holding of the ends of this profiled portion in the cuffs such as 37 of the end fittings such as 36 in the preceding example (FIG. 15), may be provided by bonding, welding, or any other appropriate means, this securing not being particularly critical in so far as the vanes 9, owing to their inclination to the radial direction and in the opposite direction to the direction of rotation of the rotor 7, are stressed in compression between the body 14 and the wall of the duct 6.

Of course, the end fitting of the vane root may be of one of the three types described hereinabove, and the end fitting of the vane tip of another of these three types, with one or more fastening tabs for each.

However, all the vanes of one and the same flow straightener preferably have the same structure for obvious reasons of balancing, aerodynamics, and interchangeability.

We claim:

1. A flow-straightener vane, for a helicopter counter-torque device comprising:

a duct of axis substantially transverse to the helicopter and passing through a fairing in the rear part of the helicopter, a rotor substantially coaxial with the duct and mounted so that said rotor can rotate in the duct on a central body, also substantially coaxial to the duct, so that rotation of said rotor generates a flow of air in the duct, and a flow-straightening stator, fixed into the duct downstream of the rotor with respect to the direction of flow of the air, and including vanes each exhibiting a main vane section with aerodynamic profile straightening out the airflow downstream of the rotor toward the axis of the duct as well as a vane root and a vane tip at the respective ends of the main vane section, and via which the vane is linked respectively to the central body and to an annular wall of the duct, so as to support the body in the latter, wherein said vane comprises a hollow metal central part forming at least the main vane section thereof, and wherein at least one of said vane root and tip is set out as an end fitting equipped with at least one transverse tab for fastening to the central body or to the wall of the duct.

2. The flow-straightener vane as claimed in claim 1, wherein the hollow central part is a hollow profiled portion of cross-section corresponding to the aerodynamic profile extending from the vane root to the vane tip.

3. The flow-straightener vane as claimed in claim 2, wherein at least one vane root or vane tip end fitting comprises a member tightly fitted into a corresponding end part of the section portion and carrying the corresponding fastening tab or tabs, which extend transversely to a span of the vane outside said section portion.

4. The flow-straightener vane as claimed in claim 2, wherein at least one vane root or vane tip end fitting is set out as a cuff in which an end part of the section portion is engaged, the cuff carrying the corresponding fastening tab or tabs.

5. The flow-straightener vane as claimed in claim 2, wherein at least one vane root or vane tip end fitting is of a single piece with the section portion and each of said fastening tabs is cambered with respect to the an associated face of the vane thereof.

6. The flow-straightener vane as claimed in claim 1, wherein each fastening tab of a vane root or vane tip end fitting extends above a suction face part or below a pressure face part of the vane and is curved with a curvature substantially corresponding to that of a surface of the central body or of the duct to which said fastening tab is fastened.

7. The flow-straightener vane as claimed in claim 1, wherein a thickness of a central portion of said hollow central part is less than a thickness in end portions of said hollow central part.

8. The flow-straightener vane as claimed in claim 1, which further comprises a spar connecting a suction face part to a pressure face part of the vane, and perpendicular to which there extends at least one tab for fastening at least one of the vane root and vane tip end fittings.

9. The flow-straightener vane as claimed in claim 1, wherein the fastening tab or tabs of the vane root are fastened by riveting to the outside of the central body and the fastening tab or tabs of the vane tip are fastened by screwing on to at least one insert fitted into the wall of the duct, in order to center the flow-straightener in the duct.

10. The flow-straightener vane as claimed in claim 9 and further including a removable shim interposed under the tab or tabs which fasten the vane tip.

11. The flow-straightener vane as claimed in claim 1, wherein the tabs for fastening the vane root or vane tip are inclined with respect to the longitudinal plane extending along the span and passing through the chord of the vane so that the vane, fixed between the central body and the wall of the duct, is inclined to the radial direction with respect to the axis of the duct.

12. The flow-straightener vane as claimed in claim 1, wherein the tabs for fastening the vane root or the vane tip are inclined with respect to the longitudinal plane passing through the chord of the vane so that the vane, fixed between the central body and the wall of the duct is inclined at a slant from a root to a tip thereof and from upstream to downstream within the duct.

13. The flow-straightener vane as claimed in claim 1 wherein the tabs for fastening the vane root or vane tip are curved with respect to the longitudinal plane extending along the span and passing through the chord of the vane so that the vane, fixed between the central body and the wall of the duct, is inclined to the radial direction with respect to the axis of the duct.

14. The flow-straightener vane as claimed in claim 1 wherein the tabs for fastening the vane root or vane tip are curved with respect to the longitudinal plane passing through the chord of the vane so that the vane, fixed between the central body and the wall of the duct is inclined at a slant from a root to a tip thereof and from upstream to downstream within the duct.

\* \* \* \* \*

UNITED STATES PATENT AND TRADEMARK OFFICE
CERTIFICATE OF CORRECTION

PATENT NO.  : 5,454,691
DATED       : October 3, 1995
INVENTOR(S) : BARQUET et al.

It is certified that error appears in the above-indentified patent and that said Letters Patent is hereby corrected as shown below:

On the title page, item [75] should read

Inventors:  Henri F. Barquet, Chateauneuf-les-Martigues;
                    Remy E. Arnaud, Vitrolles, both of France.

Signed and Sealed this

Twelfth Day of December, 1995

Attest:

BRUCE LEHMAN

*Attesting Officer*      *Commissioner of Patents and Trademarks*